US012686022B2

(12) United States Patent
Sakata et al.

(10) Patent No.: US 12,686,022 B2
(45) Date of Patent: Jul. 21, 2026

(54) TRIGGER-TYPE LIQUID SPRAYER

(71) Applicant: YOSHINO KOGYOSHO CO., LTD., Tokyo (JP)

(72) Inventors: Kota Sakata, Tokyo (JP); Kotaro Fujiwara, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 198 days.

(21) Appl. No.: 18/704,731

(22) PCT Filed: Oct. 26, 2022

(86) PCT No.: PCT/JP2022/039912

§ 371 (c)(1),
(2) Date: Apr. 25, 2024

(87) PCT Pub. No.: WO2023/074735

PCT Pub. Date: May 4, 2023

(65) Prior Publication Data

US 2025/0010319 A1 Jan. 9, 2025

(30) Foreign Application Priority Data

Oct. 29, 2021 (JP) ................................ 2021-178107

(51) Int. Cl.
*B05B 11/10* (2023.01)
*B05B 11/00* (2023.01)

(52) U.S. Cl.
CPC ...... *B05B 11/1057* (2023.01); *B05B 11/0089* (2013.01)

(58) Field of Classification Search
CPC ............. B05B 11/1057; B05B 11/0089; B05B 11/1063; B05B 11/0008; B05B 11/0044;
(Continued)

(56) References Cited

U.S. PATENT DOCUMENTS 12,343,745 B2 * 7/2025 Kakuta .............. B05B 11/1011
2008/0191061 A1 * 8/2008 Inaba ................. B05B 11/1011
239/533.1

(Continued)

FOREIGN PATENT DOCUMENTS

JP 2014-166612 A 9/2014
JP 2014-233648 A 12/2014

(Continued)

OTHER PUBLICATIONS

Nov. 11, 2025 Search Report issued in European Patent Application No. 22887060.6.

(Continued)

*Primary Examiner* — Bob Zadeh
(74) *Attorney, Agent, or Firm* — Oliff PLC

(57) ABSTRACT

The present invention is a trigger-type liquid sprayer (1) including a sprayer body (2) and a nozzle member (3) provided with a spray hole (4) through which liquid is sprayed. The sprayer body (2) includes a vertical feed tube portion (10), a connecting tube portion (20), a sealing plug (110), a trigger mechanism (80), a reservoir cylinder (40), a reservoir plunger (50), and a recovery mechanism (160). The recovery mechanism (160) is provided with a communication hole (122) in communication with the spray hole (4) and a feed hole (126) in communication with the inside of the connecting tube portion (20).

2 Claims, 5 Drawing Sheets

(58) Field of Classification Search
CPC ............... B05B 11/007; B05B 11/1067; B05B 11/1074; B05B 11/104; B05B 11/1011
See application file for complete search history.

(56) References Cited

U.S. PATENT DOCUMENTS

| | | | | |
|---|---|---|---|---|
| 2017/0216863 | A1* | 8/2017 | Kakuta | ............... B05B 11/1057 |
| 2018/0369842 | A1* | 12/2018 | Kakuta | ............... B05B 11/1066 |
| 2020/0030829 | A1* | 1/2020 | Kakuta | ................... B05B 1/341 |
| 2022/0401982 | A1 | 12/2022 | Kakuta et al. | |
| 2025/0010319 | A1* | 1/2025 | Sakata | ................ B05B 11/1011 |

FOREIGN PATENT DOCUMENTS

| | | | | | |
|---|---|---|---|---|---|
| JP | 2015-085289 | A | | 5/2015 | |
| JP | 2016-193405 | A | | 11/2016 | |
| JP | 2016209785 | A | * | 12/2016 | ......... B05B 11/1038 |
| JP | 2016221457 | A | * | 12/2016 | ......... B05B 11/1038 |
| JP | 2018-176114 | A | | 11/2018 | |
| JP | 2020-049475 | A | | 4/2020 | |
| JP | 2021-159841 | A | | 10/2021 | |
| WO | WO-2021085520 | A1 | * | 5/2021 | ............ B05B 11/011 |

OTHER PUBLICATIONS

Jan. 10, 2023 Search Report issued in International Patent Application No. PCT/JP2022/039912.
Jul. 30, 2024 Notice of Allowance issued in Japanese Patent Application No. 2021-178107.

* cited by examiner

TRIGGER-TYPE LIQUID SPRAYER

TECHNICAL FIELD

The present invention relates to a trigger-type liquid sprayer.

Priority is claimed on Japanese Patent Application No. 2021-178107, filed Oct. 29, 2021, the content of which is incorporated herein by reference.

BACKGROUND ART

Trigger-type liquid sprayers are known that suck up a liquid from inside a container body by operating a trigger part and spray the liquid through a spray hole. As such a trigger-type liquid sprayer, for example, as disclosed in the following Patent Document 1, a trigger-type liquid sprayer including a sprayer body mounted on a container body in which a liquid is accommodated and a nozzle member having a spray hole through which the liquid is sprayed is known.

A sprayer body mainly includes a vertical feed tube portion configured to suck up a liquid in a container body, a connecting tube portion extending forward from the vertical feed tube portion, a trigger part disposed movably rearward in a forward biased state and configured to inject the liquid toward the spray hole through the inside of the vertical feed tube portion and the inside of the connecting tube portion due to rearward movement, a reservoir cylinder into which the liquid passing through the inside of the vertical feed tube portion and the inside of the connecting tube portion is supplied by rearward movement of the trigger part, and a reservoir plunger disposed movably in the reservoir cylinder and configured to move rearward according to supply of the liquid into the reservoir cylinder and be biased forward by a biasing member.

In the above-mentioned trigger-type liquid sprayer, by operating the trigger part, it is possible to store a liquid in a reservoir cylinder and spray the liquid to the outside from the spray hole. Further, even when the trigger part is not operated, it is possible to spray the liquid using the reservoir plunger. Accordingly, continuous spray of the liquid can be performed. Further, the connecting tube portion is often formed to have an opening portion in consideration of moldability, for example, and the opening portion is closed (sealed) by attaching a sealing plug to the opening portion.

CITATION LIST

Patent Document

Patent Document 1

Japanese Unexamined Patent Application, First Publication No. 2021-159841

SUMMARY OF INVENTION

Technical Problem

In the trigger-type liquid sprayer including the reservoir cylinder, after the liquid is stored in the reservoir cylinder by rearward movement of the reservoir plunger, the biasing member moves the reservoir plunger forward to push out the liquid in the reservoir cylinder. For this reason, in the reservoir cylinder and in the connecting tube portion, the pressure tends to increase. In particular, the reservoir plunger blocks a communication hole that brings the inside of the reservoir cylinder in communication with the spray hole when the reservoir plunger is biased to be recovered forward by the biasing member. For this reason, a high pressure tends to remain in the connecting tube portion, and a high pressure (residual pressure) tends to act on the sealing plug that blocks the opening portion of the connecting tube portion. Accordingly, the pressure acts on the sealing plug in the direction of exiting from the opening portion, which may cause problems such as the sealing plug being unintentionally displaced or coming off the opening portion. For this reason, this may reduce sealability and cause problems such as liquid leakage or the like.

In consideration of the above-mentioned circumstances, the present invention is directed to providing a trigger-type liquid sprayer capable of reducing an unintentional residual pressure in a connecting tube portion and maintaining proper sealability by a sealing plug.

Solution to Problem

A first aspect of the present invention is a trigger-type liquid sprayer including a sprayer body mounted on a container body in which a liquid is accommodated; and a nozzle member mounted on the sprayer body, and provided with a spray hole through which the liquid is sprayed. The sprayer body includes a vertical feed tube portion configured to suck up the liquid in an inside of the container body; a connecting tube portion extending from the vertical feed tube portion and having an opening portion that opens outside the sprayer body; a sealing plug mounted in the connecting tube portion to close the opening portion; a trigger mechanism having a trigger part disposed to be movable rearward in a forward biased state, and configured to flow the liquid toward the spray hole from an inside of the vertical feed tube portion through an inside of the connecting tube portion according to rearward movement of the trigger part; a reservoir cylinder provided with a communication hole in communication with the spray hole and a feed hole in communication with the inside of the connecting tube portion, and into which the liquid passing through the inside of the vertical feed tube portion and the inside of the connecting tube portion is supplied through the feed hole according to rearward movement of the trigger part; a reservoir plunger disposed in the reservoir cylinder to be movable in an axial direction along a center axis of the reservoir cylinder, configured to move toward one side in the axial direction according to supply of the liquid into the reservoir cylinder, and biased toward the other side; and a recovery mechanism configured to recover an internal pressure of the connecting tube portion through the feed hole. The reservoir plunger is configured to block communication between an inside of the reservoir cylinder and the spray hole through the communication hole, and configured to allow communication between the inside of the reservoir cylinder and the spray hole through the communication hole when moved to the one side. The recovery mechanism is configured to allow communication between the inside of the connecting tube portion and the inside of the container body through a space between an inner circumferential surface of the reservoir cylinder and an outer circumferential surface of the reservoir plunger, and configured to release the recovered internal pressure of the connecting tube portion toward the container body.

According to the trigger-type liquid sprayer of the first aspect of the present invention, by operating the trigger part to be moved rearward, the liquid can flow toward the spray hole from the inside of the vertical feed tube portion through the inside of the connecting tube portion. Accordingly, the liquid can be supplied into the reservoir cylinder from the inside of the connecting tube portion through the feed hole, and the inside of the reservoir cylinder can be pressurized. Accordingly, the reservoir plunger can be pressed toward one side in the axial direction against a biasing force toward the other side in the axial direction. For this reason, the communication hole can be opened, and it is possible to allow communication between the inside of the reservoir cylinder and the spray hole through the communication hole. Accordingly, the liquid can be sprayed toward the outside through the spray hole of nozzle member, and the reservoir plunger can be moved toward one side. For this reason, the reservoir plunger can be moved whenever the trigger part is pulled, and the liquid can be sprayed while the liquid is stored in (i.e., fills) the reservoir cylinder. Further, when the operation of the trigger part is stopped after filling of the liquid into the reservoir cylinder, while supply of the liquid into the reservoir cylinder through the inside of the vertical feed tube portion and the inside of the connecting tube portion is stopped, the reservoir plunger begins to move back toward the other side in the axial direction. Accordingly, the liquid filled in the reservoir cylinder can be pushed out from the inside of the reservoir cylinder through the communication hole toward the spray hole, and can be sprayed from the spray hole. Accordingly, continuous spray of the liquid can be performed.

Further, since the reservoir plunger returns to its original position by recovering movement and closes the communication hole, it is possible to prevent the liquid from reaching the spray hole. Accordingly, it is possible to prevent the liquid from leaking from the spray hole. Incidentally, even if the internal pressure in the connecting tube portion is increased by blocking the communication hole, the internal pressure of the connecting tube portion can be recovered and released into the container body using the recovery mechanism configured to allow communication between the inside of the connecting tube portion and the inside of the container body through a space between the inner circumferential surface of the reservoir cylinder and the outer circumferential surface of the reservoir plunger. That is, some of the liquid in the connecting tube portion can be recovered and released (returned) into the container body. Accordingly, the residual pressure (internal pressure) remaining in the connecting tube portion can be reduced, and stress acting on the sealing plug that closes (seals) the opening portion of the connecting tube portion can be reduced. Accordingly, it is possible to prevent inconveniences such as an unintentional position shift of the sealing plug or the like. Accordingly, it is possible to prevent occurrence of liquid leakage or the like by maintaining appropriate sealability of the opening portion, and it is possible to provide the trigger-type liquid sprayer appropriate for continuous spray.

According to a second aspect of the present, in the trigger-type liquid sprayer of the first aspect, the outer circumferential surface of the reservoir plunger includes: an annular first lip portion provided therein, disposed on the one side in the axial direction and in sliding contact with the inner circumferential surface of the reservoir cylinder; and an annular second lip portion provided therein, disposed on the other side in the axial direction, and in sliding contact with the inner circumferential surface of the reservoir cylinder. The recovery mechanism includes: an annular space defined between the inner circumferential surface of the reservoir cylinder and the outer circumferential surface of the reservoir plunger and between the first lip portion and the second lip portion; a recovery passage provided in the vertical feed tube portion, and configured to allow communication between an inside of the annular space and the inside of the container body; and a recovery part provided between the inner circumferential surface of the reservoir cylinder and the second lip portion, and configured to allow communication between the inside of the annular space and the inside of the connecting tube portion through the feed hole.

In this case, even when the internal pressure in the connecting tube portion is increased, some of the liquid in the connecting tube portion can be recovered into the annular space through the feed hole and the recovery part, and the liquid recovered in the annular space through the recovery passage can be returned into the container body. In this way, since the recovery mechanism can return some of the liquid in the connecting tube portion into the container body using the recovery part, the annular space and the recovery passage, the residual pressure remaining in the connecting tube portion can be more appropriately reduced.

According to a third aspect of the present invention, in the trigger-type liquid sprayer of the second aspect, the recovery part includes: a recovery concave part formed in the inner circumferential surface of the reservoir cylinder, and on which the second lip portion is disposed.

In this case, in a process in which the reservoir plunger is recovered toward the other side in the axial direction to return to its original position, the second lip portion in sliding contact with the inner circumferential surface of the reservoir cylinder is disposed in the recovery concave part. Accordingly, it is possible to cause the second lip portion to come into contact with the recovery concave part with a sealing force weaker than a sealing force with respect to the inner circumferential surface of the reservoir cylinder. Accordingly, some of the liquid in the connecting tube portion can be easily gradually released into the annular space through the space between the second lip portion and the recovery concave part. Accordingly, the residual pressure remaining in the connecting tube portion can be gradually reduced. In particular, since the recovery part can be simply formed by only forming the annular recovery concave part in the inner circumferential surface of the reservoir cylinder, simplification of the configuration is easily achieved.

According to a fourth aspect of the present invention, in the trigger-type liquid sprayer of the third aspect, the recovery concave part includes:

a convex rib protruding toward the reservoir plunger, and configured to push up a part of the second lip portion toward an inner side of the reservoir cylinder.

In this case, since a part of the second lip portion is pushed up by the convex rib, for example, a slight gap can be formed around the convex rib. Accordingly, the gap can be used preferentially, and the residual pressure remaining in the connecting tube portion can be gradually reduced more stably and smoothly.

Effects of Invention

According to the trigger-type liquid sprayer of the present invention, it is possible to reduce an unintentional residual pressure in the connecting tube portion and maintain proper sealability by the sealing plug.

DESCRIPTION OF EMBODIMENTS

Hereinafter, an embodiment of a trigger-type liquid sprayer according to the present invention will be described with reference to the accompanying drawings. In the embodiment, a spray container in which a trigger-type liquid sprayer is attached to a container body will be exemplarily described.

Figure 1:
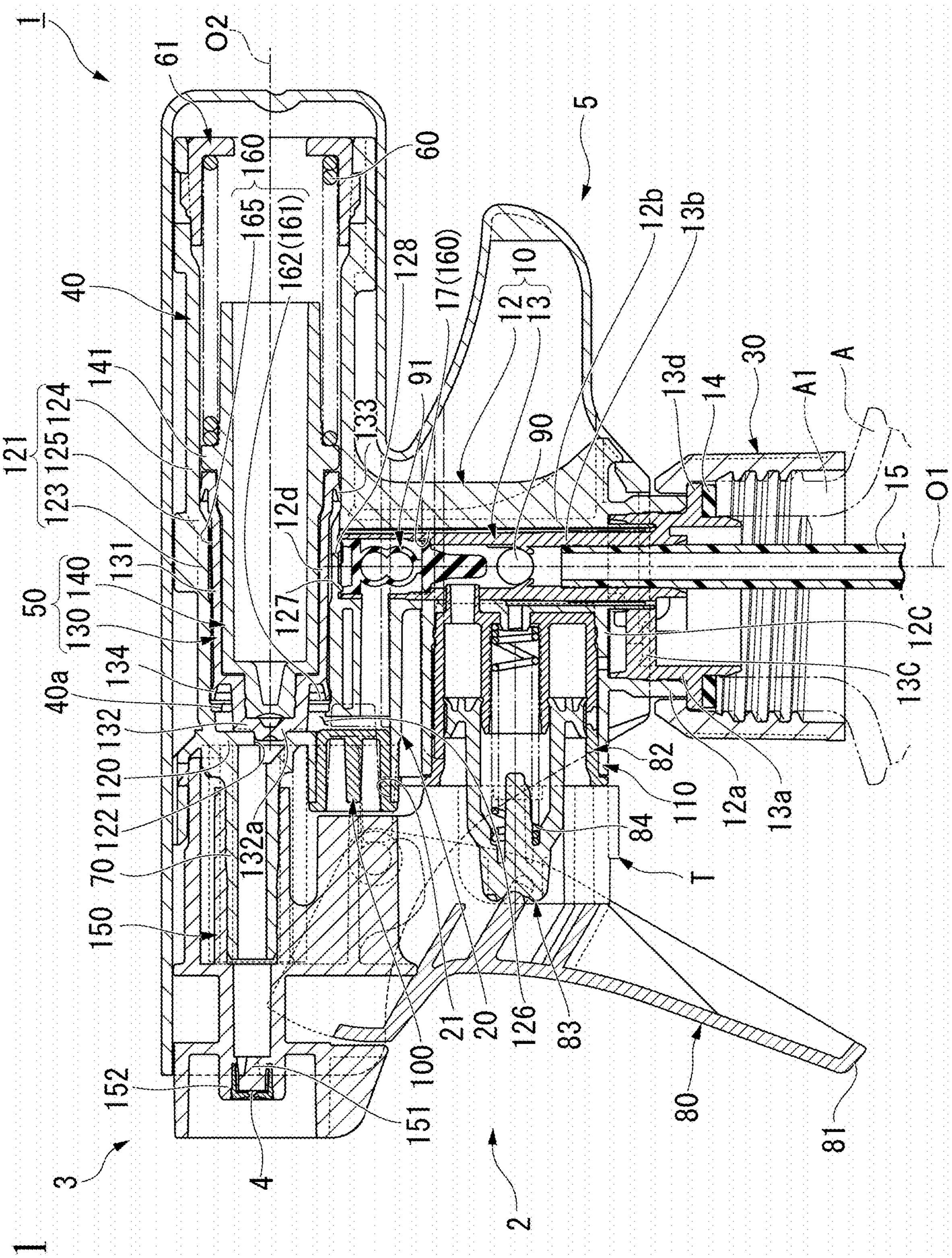
FIG. 1 is a longitudinal cross-sectional view showing an embodiment of a trigger-type liquid sprayer according to the present invention.

As shown in FIG. 1, a trigger-type liquid sprayer 1 of the embodiment includes a sprayer body 2 mounted on a container body A in which a liquid is accommodated, a nozzle member 3 provided with a spray hole 4 through which the liquid is sprayed and mounted on the sprayer body 2, and a cover body 5 configured to cover the sprayer body 2 and the nozzle member 3. Further, each component of the trigger-type liquid sprayer 1 is a molded product using a synthetic resin unless the context indicates otherwise.

(Sprayer Body)

The sprayer body 2 mainly includes a vertical feed tube portion 10, a connecting tube portion 20, a mounting cap 30, a reservoir cylinder 40, a reservoir plunger 50, a biasing member 60, an injection tube portion 70, a trigger mechanism 80, a ball valve 90, a storage valve 91, and a recovery mechanism 160.

In the embodiment, a center axis of the vertical feed tube portion 10 is referred to as an axis O1, a side of the container body A along the axis O1 is referred to as a lower side, an opposite side thereof is referred to as an upper side, and a direction along the axis O1 is referred to as an upward/downward direction. In addition, when seen in a plan view in the upward/downward direction, one direction crossing the axis O1 is referred to as a forward/rearward direction, and a direction perpendicular to both directions of the upward/downward direction and the forward/rearward direction is referred to as a leftward/rightward direction. Further, when seen in the upward/downward direction, a direction crossing the axis O1 is referred to as a radial direction.

Further, in the embodiment, a center axis of the reservoir cylinder 40 is referred to as an axis O2. In the embodiment, the axis O2 extends in the forward/rearward direction. Accordingly, in the embodiment, the forward/rearward direction corresponds to an axial direction along the center axis of the reservoir cylinder 40. Further, in the embodiment, a rear side corresponds to one side in the axial direction along the center axis of the reservoir cylinder 40, and a front side corresponds to the other side in the axial direction along the center axis of the reservoir cylinder 40. However, the axial direction along the axis O2 may not coincide with the forward/rearward direction. Further, when seen in the forward/rearward direction, a direction crossing the axis O2 is referred to as a cylinder radial direction, and a direction around the axis O2 is referred to as a cylinder circumferential direction.

The vertical feed tube portion 10 extends in the upward/downward direction and has a function of sucking up a liquid in the container body A. The vertical feed tube portion 10 is mounted on the container body A by the mounting cap 30. The vertical feed tube portion 10 includes a topped cylindrical outer tube 12, and an inner tube 13 fitted into the outer tube 12. Further, the axis O1 of the vertical feed tube portion 10 is located behind a container shaft of the container body A.

The outer tube 12 includes a large diameter portion 12*a*, a small diameter portion 12*b* disposed above the large diameter portion 12*a* and having a diameter smaller than the large diameter portion 12*a*, and an annular connecting portion 12*c* that connects an upper end portion of the large diameter portion 12*a* and a lower end portion of the small diameter portion 12*b*. The small diameter portion 12*b* is formed in a topped cylindrical shape and disposed coaxially with the axis O1. Atop wall portion 12*d* of the small diameter portion 12*b* is formed integrally with the reservoir cylinder 40.

The inner tube 13 includes a large diameter portion 13*a*, a small diameter portion 13*b* disposed above the large diameter portion 13*a* and having a diameter smaller than the large diameter portion 13*a*, and an annular connecting portion 13*c* that connects an upper end portion of the large diameter portion 13*a* and a lower portion of the small diameter portion 13*b*. The large diameter portion 13*a* is disposed in the large diameter portion 12*a* of the outer tube 12. An annular flange portion 13*d* protruding outward in the radial direction is formed in a portion of the large diameter portion 13*a* protruding downward from the large diameter portion 12*a* of the outer tube 12. The flange portion 13*d* is disposed on an upper end opening edge in a mouth portion A1 of the container body A via a packing 14, and, for example, sandwiched between the mounting cap 30 screwed and mounted on the mouth portion A1 of the container body A and the upper end opening edge of the mouth portion A1 in the upward/downward direction. Accordingly, the sprayer body 2 is mounted on the mouth portion of the container body A via the mounting cap 30 as a whole.

The small diameter portion 13*b* is formed in a cylindrical shape and disposed coaxially with the axis O1. The small diameter portion 13*b* is open on both sides in the upward/downward direction and disposed in the small diameter portion 12*b* of the outer tube 12. The upper end opening edge of the small diameter portion 13*b* is spaced slightly further downward than the top wall portion 12*d* of the outer tube 12. An upper end portion of a pipe 15 extending in the upward/downward direction is fitted into the lower portion of the small diameter portion 13*b*. Further, the lower end opening portion of the pipe 15 is located in a bottom portion (not shown) of the container body A.

A recovery passage 17 is provided between the outer tube 12 and the inner tube 13 configured as described above. The recovery passage 17 extends in the upward/downward direction and is open on both sides in the upward/downward direction. Specifically, the recovery passage 17 becomes a longitudinal groove formed in the outer circumferential surface of the small diameter portion 13*b* of the inner tube 13 and extending in the upward/downward direction, and is located behind the axis O1. The recovery passage 17 is formed over the entire length of the small portion 13*b* in the upward/downward direction, and a lower end portion thereof opens into the large diameter portion 13*a*. Accordingly, the recovery passage 17 is in communication with the inside of the container body A. Further, the recovery passage 17 is a part that constitutes the recovery mechanism 160, which will be described below.

The connecting tube portion 20 extending forward is provided on the upper end portion of the vertical feed tube portion 10. The connecting tube portion 20 is formed in a tubular shape having an opening portion 21 that is open toward from the sprayer body 2, and is in communication with the inside of the vertical feed tube portion 10. A sealing plug 100 is mounted in the opening portion 21 of the connecting tube portion 20, and closes (seals) the opening portion 21.

A tube portion for a cylinder 110 is provided below the connecting tube portion and above the mounting cap 30. The tube portion for a cylinder 110 protrudes forward from the vertical feed tube portion 10 and opens forward. Further, a part of the tube portion for a cylinder 110 is formed integrally with the outer tube 12 in the vertical feed tube portion 10. A bottom cylinder 82 is fitted into the tube portion for a cylinder 110. The bottom cylinder 82 is formed in a bottomed cylindrical shape that is open at a front side and closed at a rear side. The inside of the bottom cylinder 82 is in communication with the inside of the vertical feed tube portion 10.

The reservoir cylinder 40 is disposed above the vertical feed tube portion 10 and the connecting tube portion 20. The liquid passing through the inside of the vertical feed tube portion 10 and the inside of the connecting tube portion 20 is supplied into the reservoir cylinder 40 (a storage space 40*a*, which will be described below) by rearward swinging of a trigger part 81. The reservoir cylinder 40 is disposed to extend in the forward/rearward direction and cross the vertical feed tube portion 10 in the forward/rearward direction. In the example shown, the reservoir cylinder 40 is disposed substantially parallel to the connecting tube portion 20 and the tube portion for a cylinder 110. Further, the lower end portion of the reservoir cylinder 40 is formed integrally with the upper end portion of the vertical feed tube portion 10 and the upper end portion of the connecting tube portion 20.

The reservoir cylinder 40 includes a front wall portion 120 and a cylinder tube 121 extending rearward from the front wall portion 120, and formed in a topped tubular shape that is open at a rear side as a whole and closed at a front side. A communication hole 122 passing through the front wall portion 120 in the forward/rearward direction is formed in the front wall portion 120. The communication hole 122 is formed in, for example, a circular shape, and disposed coaxially with the axis O2. The communication hole 122 opens toward the storage space 40*a* in the reservoir cylinder 40 and the inside of the injection tube portion 70 in communication with the spray hole 4.

The cylinder tube 121 includes a front tube portion 123 extending rearward from the front wall portion 120, a rear tube portion 124 having an outer diameter and an inner diameter greater than the front tube portion 123 and located behind the front tube portion 123, and a stepped portion 125 that connects the front tube portion 123 and the rear tube portion 124 in the forward/rearward direction. The stepped portion 125 has a diameter that is increased from the front side toward the rear side. Further, the top wall portion 12*d* of the outer tube 12 is connected to the connecting portion between the front tube portion 123 and the stepped portion 125. The rear tube portion 124 is located behind the vertical feed tube portion 10.

Further, a feed hole 126, a communication groove 127, and a recovery hole 128 are formed in the reservoir cylinder 40. The feed hole 126 opens toward a portion of the lower portion in the front tube portion 123 and is located behind the sealing plug 100. Accordingly, the liquid passing through the inside of the vertical feed tube portion 10 and the inside of the connecting tube portion 20 can be supplied into the reservoir cylinder 40 through the feed hole 126.

The communication groove 127 is formed in the inner circumferential surface of the rear portion of the front tube portion 123. Further, the plurality of communication grooves 127 are disposed at intervals in the cylinder circumferential direction. The recovery hole 128 integrally penetrates the connecting portion between the front tube portion 123 and the stepped portion 125, and the top wall portion 12*d* of the outer tube 12 in the upward/downward direction. The recovery hole 128 opens toward the upper end portion of the recovery passage 17 provided in the vertical feed tube portion 10. Accordingly, the recovery hole 128 is in communication with the container body A through the recovery passage 17. Further, the communication groove 127 located below the plurality of communication grooves 127 is open in the recovery hole 128.

The reservoir plunger 50 is disposed movably in the forward/rearward direction along the axis O2 in the reservoir cylinder 40. Accordingly, the reservoir plunger 50 slides tightly within the reservoir cylinder 40 in the forward/rearward direction. The reservoir plunger 50 is moved rearward according to supply of the liquid into the reservoir cylinder 40. The reservoir plunger 50 blocks communication of the inside of the vertical feed tube portion 10 passing through the communication hole 122 and the connecting tube portion 20 with the spray hole 4, and allows communication of the inside of the vertical feed tube portion 10 passing through the communication hole 122 and the connecting tube portion 20 with the spray hole 4 when moved rearward.

That is, the reservoir plunger 50 blocks communication of the inside of the vertical feed tube portion 10 passing through the communication hole 122 and the connecting tube portion 20 with the spray hole 4 (the inside of the injection tube portion 70) at the foremost position, and allows communication of the inside of the vertical feed tube portion 10 passing through the communication hole 122 and the connecting tube portion 20 with the spray hole 4 (the inside of the injection tube portion 70) when moved rearward from the foremost position.

The reservoir plunger 50 includes a sliding member 130 configured to slide through the inside of the reservoir cylinder 40 in the forward/rearward direction, and a receiving member 140 fitted into the sliding member 130. The sliding member 130 and the receiving member 140 are formed in a tubular shape extending in the forward/rearward direction and disposed coaxially with the axis O2.

The sliding member 130 is formed in a topped tubular shape having a plunger tube 131 extending in the forward/rearward direction, and a blocking wall 132 configured to close the front end opening of the plunger tube 131. An annular rear lip portion (first lip portion) 133 disposed on a rear side (disposed on one side in the axial direction along the axis O2) and configured to slide on the inner circumferential surface of the reservoir cylinder 40 and an annular front lip portion (second lip portion) 134 configured to slide on the inner circumferential surface of the reservoir cylinder 40 disposed on a front side (disposed on the other side in the axial direction along the axis O2) are formed in the outer circumferential surface of the plunger tube 131.

Figure 2:
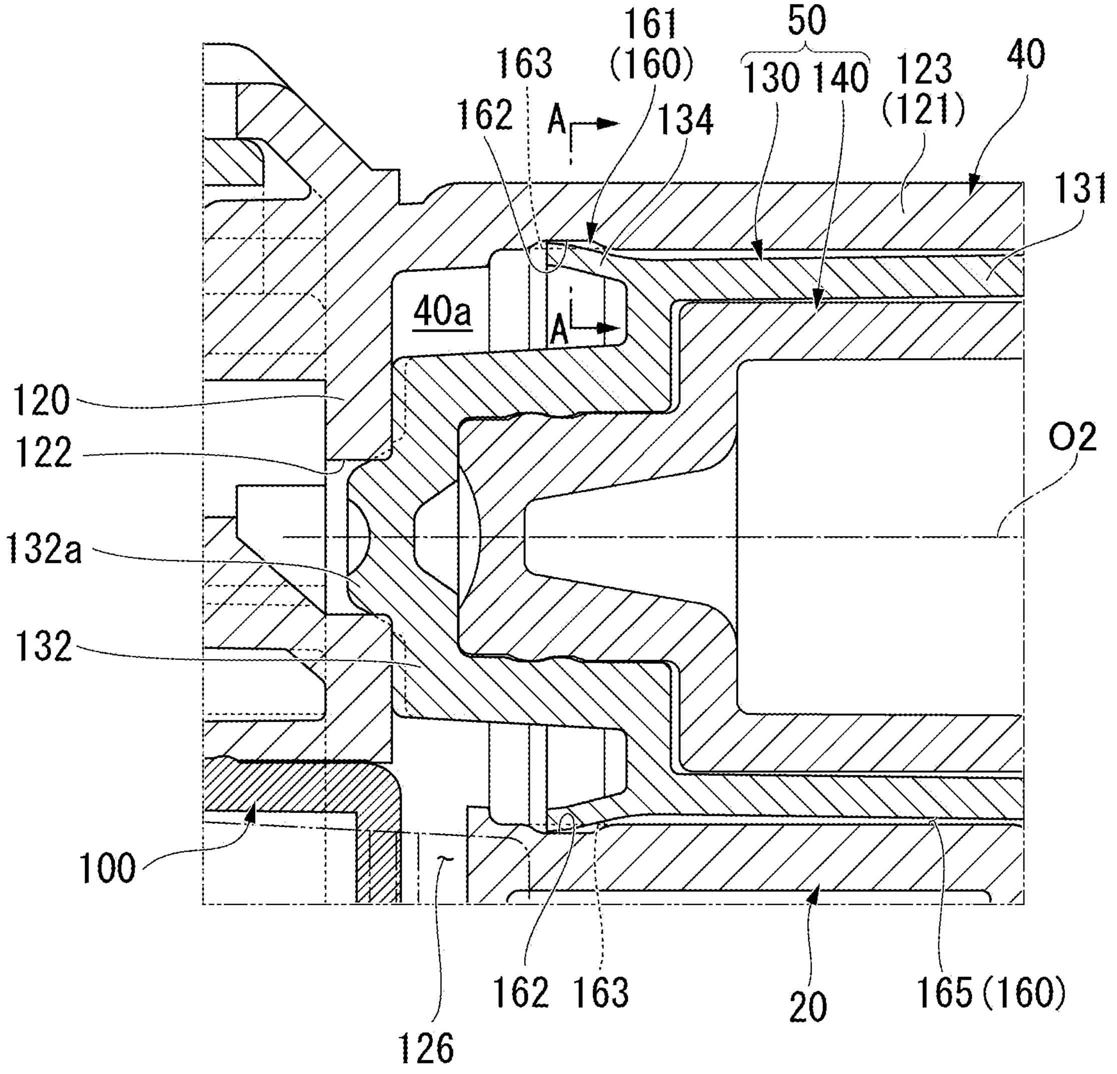
FIG. 2 is an enlarged cross-sectional view of a periphery of a front lip portion in a reservoir plunger shown in FIG. 1.
Figure 3:
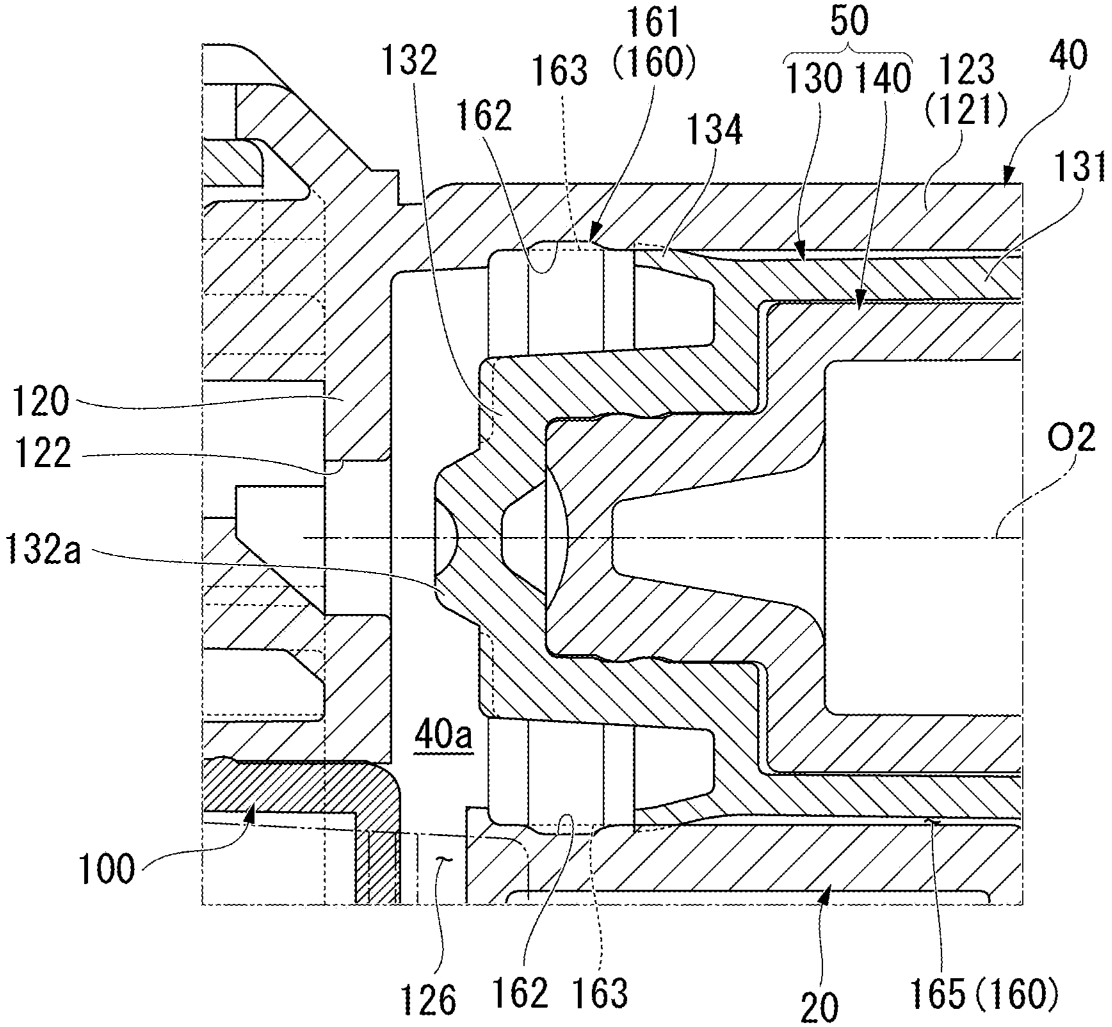
FIG. 3 is a cross-sectional view showing a state in which the reservoir plunger shown in FIG. 2 is moved rearward.

As shown in FIG. 2 and FIG. 3, the front lip portion 134 tightly slides on the inner circumferential surface of the front tube portion 123 in the cylinder tube 121 in the forward/rearward direction. Accordingly, sealability between the front lip portion 134 and the inner circumferential surface of the front tube portion 123 is ensured. As shown in FIG. 1, the rear lip portion 133 tightly slides on the inner circumferential surface of the rear tube portion 124 in the cylinder tube 121 in the forward/rearward direction. Accordingly, sealability between the rear lip portion 133 and the inner circumferential surface of the rear tube portion 124 is ensured.

A space in the reservoir cylinder 40 located in front of the front lip portion 134 functions as the storage space 40*a* configured to bring the feed hole 126 and the communication hole 122 in communication with each other. The storage space 40*a* stores the liquid passing through the inside of the vertical feed tube portion 10 and the inside of the connecting tube portion 20 and passing through the feed hole 126. The storage space 40*a* expands as the reservoir plunger 50 is moved rearward by supply of the liquid. Further, the storage space 40*a* can come into communication with the injection tube portion 70 through the communication hole 122.

As shown in FIG. 2, the blocking wall 132 can be attached to the rear surface of the front wall portion 120 of the reservoir cylinder 40. A protrusion 132*a* protruding forward is formed in the front surface of the blocking wall 132. The protrusion 132*a* is disposed coaxially with the axis O2, and is formed, for example, in the shape of a truncated cone, with an outer diameter decreasing from the rear side toward the front side. Further, the outer circumferential surface of the protrusion 132*a* can abut the inside of the communication hole 122 and close the communication hole 122.

As shown in FIG. 1, the receiving member 140 is formed in a topped tubular shape that is open at a rear side and closed at a front side, and disposed inside the plunger tube 131. A rear portion of the receiving member 140 advances into the rear tube portion 124 by protruding rearward from the rear end opening portion of the plunger tube 131. An annular receiving seat portion 141 protruding outward in the cylinder radial direction is formed in the outer circumferential surface of the portion of the receiving member 140 located behind the plunger tube 131. Further, the receiving seat portion 141 abuts or approaches a rear end opening edge of the plunger tube 131.

The biasing member 60 biases the reservoir plunger 50 forward. The biasing member 60 is disposed while being compressed in forward/rearward direction between a support member 61 mounted on the rear end portion of the reservoir cylinder 40 and the receiving seat portion 141 in a state in which the receiving member 140 is surrounded from the outer side in the cylinder radial direction. The biasing member 60 biases the reservoir plunger 50 forward in an initial state before the trigger part 81 is operated. Accordingly, the reservoir plunger 50 is located at the foremost position. Further, the biasing member 60 is a metal coil spring disposed coaxially with the axis O2. However, for example, a resin spring may be used as the biasing member 60, or other elastic members may be used.

In the reservoir cylinder 40 and the reservoir plunger 50 configured as described above, the liquid can be pressurized in the storage space 40*a* until the reservoir plunger 50 is moved rearward. After that, when a liquid pressure in the storage space 40*a* reaches a predetermined value, the reservoir plunger 50 is moved rearward against the biasing member 60. Accordingly, as shown in FIG. 3, the communication hole 122 can be opened, and the liquid in the storage space 40*a* can be supplied toward the spray hole 4 through the communication hole 122. Accordingly, the reservoir plunger 50 can function as an accumulator valve.

As shown in FIG. 1, the injection tube portion 70 extends forward from the reservoir cylinder 40. The injection tube portion 70 is in communication with the inside of the vertical feed tube portion 10 through the inside of the reservoir cylinder 40 (the storage space 40*a*) and the inside of the connecting tube portion 20. Accordingly, the injection tube portion 70 can guide the liquid passing through the inside of the vertical feed tube portion 10, the inside of the connecting tube portion 20, the inside of the reservoir cylinder 40 (the storage space 40*a*) to the spray hole 4.

The trigger mechanism 80 includes the trigger part 81, the bottom cylinder 82, a main piston 83, and a coil spring 84. The trigger mechanism 80 can cause the liquid to flow toward the spray hole 4 from the inside of the vertical feed tube portion 10 through the inside of the connecting tube portion 20 according to rearward swinging of the trigger part 81.

The trigger part 81 is disposed in front of the vertical feed tube portion 10 to be movable rearward in a forward biased state. The trigger part 81 is formed to extend in the upward/downward direction, and disposed below the injection tube portion 70. The trigger part 81 has an upper end portion axially supported by the nozzle member 3 to be swingable in the forward/rearward direction, and a lower end portion disposed in front of the bottom cylinder 82.

Further, in the example shown, a stopper T is detachably provided in a gap between the trigger part 81 and the bottom cylinder 82 in the forward/rearward direction. The stopper T restricts rearward swinging of the trigger part 81 by abutting each of the trigger part 81 and the bottom cylinder 82. However, the stopper T may be not necessary and may be omitted.

The main piston 83 is disposed in the bottom cylinder 82 to be movable in the forward/rearward direction. The main piston 83 is movable in the forward/rearward direction in conjunction with the swinging of the trigger part 81. Accordingly, the inside of the bottom cylinder 82 is pressurized and depressurized according to movement of the main piston 83 in the forward/rearward direction. Further, the main piston 83 is formed in a topped tubular shape that is open at the rear side and closed at the front side.

The main piston 83 is biased forward by the biasing force of the coil spring 84 together with the trigger part 81. The main piston 83 moves rearward and is pushed into the bottom cylinder 82 as the trigger part 81 swings rearward. Further, the main piston 83 is located at the foremost position corresponding to the trigger part 81 located at the foremost swing position when the trigger part 81 is located at the foremost swing position.

The coil spring 84 is formed of, for example, a metal. The coil spring 84 is disposed coaxially with the main piston 83 and the bottom cylinder 82, and biases the trigger part 81 forward via the main piston 83. The coil spring 84 is disposed between a bottom wall of the main piston 83 and a top wall of the bottom cylinder 82. However, a material of the coil spring 84 is not limited to the metal and may employ, for example, a resin spring or the like.

The ball valve 90 and the storage valve 91 are provided in the vertical feed tube portion 10. The ball valve 90 is a check valve configured to block communication between the inside of the container body A and the inside of the bottom cylinder 82 through the inside of the vertical feed tube portion 10 upon compression in the bottom cylinder 82, and configured to allow communication between the inside of the container body A and the inside of the bottom cylinder 82 through the inside of the vertical feed tube portion 10 according to upward displacement upon decompression in the bottom cylinder 82.

The storage valve 91 is disposed above the ball valve 90. The storage valve 91 is a check valve configured to allow supply of the liquid into the reservoir cylinder 40 from the inside of the vertical feed tube portion 10 through the inside of the connecting tube portion 20 and configured to restrict outflow of the liquid into the vertical feed tube portion 10 from the inside of the reservoir cylinder 40 through the inside of the connecting tube portion 20.

The cover body 5 is formed to cover the entire vertical feed tube portion 10 except the lower end portion, the entire the injection tube portion 70, and the entire reservoir cylinder 40 from at least both sides and above in the leftward/rightward direction.

(Nozzle Member)

The nozzle member 3 is assembled to the sprayer body 2 using the injection tube portion 70 mainly. The nozzle member 3 includes a mounting tube portion 150 fitted onto the injection tube portion 70 from the front, a nozzle shaft portion 151 located inside the front end portion in the mounting tube portion 150, and a nozzle cap 152 mounted on the nozzle shaft portion 151. The spray hole 4 opening forward and configured to spray the liquid forward is formed in the nozzle cap 152.

(Recovery Mechanism)

As shown in FIG. 1 to FIG. 3, the trigger-type liquid sprayer 1 configured as described above includes the recovery mechanism 160 configured to recover an internal pressure of the connecting tube portion 20 through the feed hole 126. The recovery mechanism 160 can release the recovered internal pressure of the connecting tube portion toward the container body A while bringing the inside of the connecting tube portion and the inside of the container body A in communication with each other through a space between the inner circumferential surface of the reservoir cylinder 40 and the outer circumferential surface of the reservoir plunger 50.

This will be described in detail.

The recovery mechanism 160 includes an annular space 165 formed between the inner circumferential surface of the reservoir cylinder 40 and the outer circumferential surface of the reservoir plunger 50, the recovery passage 17 formed in the vertical feed tube portion 10, a recovery part 161 provided between the inner circumferential surface of the reservoir cylinder 40 and the outer circumferential surface of the reservoir plunger 50 and configured to bring the inside of the annular space 165 and the inside of the connecting tube portion 20 in communication with each other through the feed hole 126, and can release the residual pressure (internal pressure) remained in the connecting tube portion 20 into the container body A.

As described above, the front lip portion 134 and the rear lip portion 133 are formed in the outer circumferential surface of the reservoir plunger 50 at an interval in the forward/rearward direction. Accordingly, the annular space 165 is defined in a portion located between the inner circumferential surface of the reservoir cylinder 40 and the outer circumferential surface of the reservoir plunger 50 and located between the front lip portion 134 and the rear lip portion 133.

The rear lip portion 133 is disposed behind the recovery passage 17 provided in the vertical feed tube portion 10 because the rear lip portion 133 tightly slides on the inner circumferential surface of the rear tube portion 124 in the cylinder tube 121 in the forward/rearward direction. Accordingly, the recovery passage 17 is in communication with the inside of the annular space 165. Accordingly, the inside of the annular space 165 is in communication with the inside of the container body A through the recovery passage 17. Further, regardless of the forward and rearward movement of the reservoir plunger 50, the inside of the annular space 165 and the inside of the recovery passage 17 are always in communication with each other.

The recovery part 161 is formed in the reservoir cylinder 40 to bring the inside of the annular space 165 and the inside of the connecting tube portion 20 in communication with each other in a process in which the reservoir plunger 50 is moved forward (toward the other side in the axial direction along the axis O2) to reach the foremost position. Specifically, the recovery part 161 has a recovery concave part 162 formed in the inner circumferential surface of the front tube portion 123 in the reservoir cylinder 40 and in which the front lip portion 134 is disposed. The recovery concave part 162 is formed to be recessed outward from the inner circumferential surface of the front tube portion 123 in the cylinder radial direction, and formed such that the front lip portion 134 is disposed therein when the reservoir plunger 50 is located at the foremost position. Further, in the embodiment, the recovery concave part 162 is formed in an annular shape extending in the cylinder circumferential direction throughout the entire circumference of the front tube portion 123. In the example shown, the recovery concave part 162 is formed to be recessed to a fixed depth in the forward/rearward direction.

However, the recovery concave part 162 is not limited to being formed in an annular shape, but may be formed, for example, in a circumferential groove extending in the cylinder circumferential direction. Further, the plurality of recovery concave parts 162 formed in the circumferential groove shape may be disposed at an interval (disposed intermittently) in the cylinder circumferential direction.

The recovery concave part 162 is positioned with respect to the front lip portion 134 such that the outer edge portion of the front lip portion 134 comes into contact with the recovery concave part 162 at a central position in the forward/rearward direction when the reservoir plunger 50 reaches the foremost position.

When the front lip portion 134 is located within the recovery concave part 162, it elastically deforms so as to expand outward in the cylinder radial direction by the depth of the recovery concave part 162. For this reason, as shown in FIG. 2 and FIG. 3, the front lip portion 134 comes into contact with the recovery concave part 162 with a sealing force weaker than a sealing force (contact force) with respect to the inner circumferential surface of the reservoir cylinder 40. For example, the front lip portion 134 comes into contact with the recovery concave part 162 with a sealing force such that the outer diameter of the front lip portion 134 is the same as the inner diameter of the recovery concave part 162 (i.e., a sealing force such that interference is zero). Accordingly, when the pressure in the connecting tube portion 20 increases due to the residual pressure, the pressure can be released toward the annular space 165 from the side of the connecting tube portion 20 through the space between the front lip portion 134 and the recovery concave part 162.

Further, when the liquid is supplied into the storage space 40*a* of the reservoir cylinder 40 from the inside of the connecting tube portion 20 through the feed hole 126, the reservoir plunger 50 is easily moved rearward as the storage space 40*a* is pressurized. That is, since the interference between the front lip portion 134 and the recovery concave part 162 is zero, starting to rearward movement of the reservoir plunger 50 can be smoothly performed, and rearward movement of the reservoir plunger 50 can be easily performed.

However, it is not limited to the case in which the interference between the front lip portion 134 and the recovery concave part 162 is zero, and for example, a slight gap may be formed between the front lip portion 134 and the recovery concave part 162.

Figure 4:
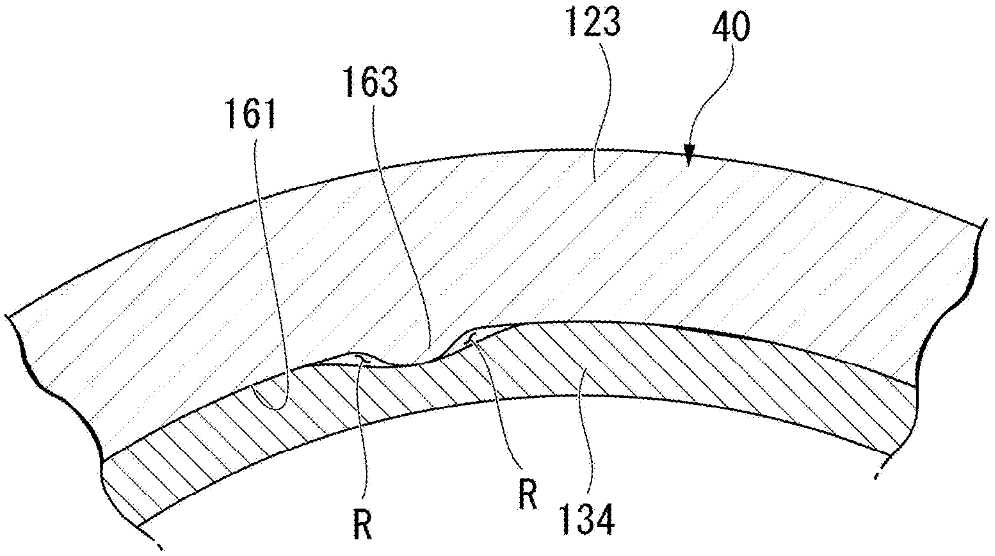
FIG. 4 is a longitudinal cross-sectional view along line A-A shown in FIG. 2.

Further, in the embodiment, as shown in FIG. 2 and FIG. 4, a convex rib 163 protruding inward in the cylinder radial direction (toward the reservoir plunger 50) is formed in the recovery concave part 162. The convex rib 163 is formed in a lateral rib shape extending in the forward/rearward direction, and protrudes inward in the cylinder radial direction. In the example shown, the convex rib 163 is formed with a protrusion amount that is a height equivalent to the inner circumferential surface of the reservoir cylinder 40. However, the protrusion amount of the convex rib 163 is not limited to this case, and for example, may be formed with a height so as not to protrude further inward in the cylinder radial direction than the inner circumferential surface of the reservoir cylinder 40 (protrusion amount).

Further, the plurality of convex ribs 163 are formed at an interval in the cylinder circumferential direction. However, the number of convex ribs 163 is not limited to multiple and only one may be formed. Further, as described above, when the plurality of recovery concave parts 162 having a circumferential groove shape are disposed at an interval in the cylinder circumferential direction, a portion located between the recovery concave parts 162 neighboring in the cylinder circumferential direction may function as the convex rib 163.

The convex rib 163 configured as described above pushes a portion of the front lip portion 134 toward the inner side in the cylinder radial direction. Accordingly, slight gaps R (see FIG. 4) opening in the forward/rearward direction and configured to bring the inside of the connecting tube portion 20 and the inside of the annular space 165 in communication with each other can be actively formed on both sides with the convex rib 163 sandwiched therebetween in the cylinder circumferential direction. Further, even though the gaps R are formed, when the liquid is supplied into the storage space 40*a* to pressurize the inside of a storage space 40*a* by the operation of the trigger part 81, the pressure acting on the front lip portion 134 is much larger than the pressure releasing through the gaps R. Accordingly, as described above, starting to rearward movement of the reservoir plunger 50 can be smoothly performed, and rearward movement of the reservoir plunger 50 can be easily performed.

(Effects of Trigger-Type Liquid Sprayer)

Next, the case in which the trigger-type liquid sprayer 1 configured as described above is used will be described. Further, the liquid is filled in each part of the trigger-type liquid sprayer 1 by operating the trigger part 81 shown in FIG. 1 a plurality of times, and the liquid can be sucked up into the vertical feed tube portion 10.

After the stopper T is removed, when the trigger part 81 is operated to be pulled rearward against the biasing force of the coil spring 84, the main piston 83 is moved rearward from the foremost position, and the inside of the bottom cylinder 82 is pressurized. Accordingly, the liquid in the bottom cylinder 82 is supplied into the vertical feed tube portion 10. The liquid supplied into the vertical feed tube portion 10 pushes the ball valve 90 downward and pushes the storage valve 91 up.

Accordingly, the liquid in the vertical feed tube portion 10 can be supplied into the storage space 40*a* of the reservoir cylinder 40 through the inside of the connecting tube portion 20 and the feed hole 126, and the storage space 40*a* can be pressurized. Accordingly, according to pressurization of the storage space 40*a*, the reservoir plunger 50 can be moved rearward from the foremost position against the biasing force of the biasing member 60, and the liquid can be stored (filled) in the storage space 40*a*. In addition, as the reservoir plunger 50 is moved rearward, the communication hole 122 can be open (see FIG. 3). Accordingly, the liquid in the storage space 40*a* with the increased pressure can be guided to the spray hole 4 through the communication hole 122 and the inside of the injection tube portion 70. Accordingly, the liquid can be sprayed forward from the spray hole 4, and the reservoir plunger 50 can be moved rearward.

Accordingly, whenever the trigger part 81 is pulled rearward, the reservoir plunger 50 is moved rearward while the liquid is sprayed from the spray hole 4, and the liquid can be stored in the storage space 40*a*.

After that, when the trigger part 81 is released, since the main piston 83 is recovered and moved forward in the bottom cylinder 82 by an elastic recovery force (biasing force) of the coil spring 84, the trigger part 81 is also recovered and moved according to this. For this reason, since the inside of the bottom cylinder 82 is depressurized to become a pressure lower than the pressure in the container body A, the ball valve 90 can be raised in a state in which the storage valve 91 is closed. Accordingly, the liquid in the container body A can be sucked up into the vertical feed tube portion 10 and guided into the bottom cylinder 82. Accordingly, the next spray can be prepared.

Further, when the rearward operation of the trigger part 81 is stopped, the reservoir plunger 50 starts to move forward toward the foremost position due to the biasing force of the biasing member 60 while stopping supply of the liquid into the storage space 40*a* through the inside of the vertical feed tube portion 10 and the inside of the connecting tube portion 20. Further, here, outflow of the liquid into the vertical feed tube portion 10 from the storage space 40*a* is restricted by the storage valve 91.

Accordingly, the liquid stored in the storage space 40*a* can be guided into the spray hole 4 through the communication hole 122 and the inside of the injection tube portion 70, and the liquid can be continuously sprayed forward through the spray hole 4. In this way, the liquid can be sprayed not only when the trigger part 81 is pulled rearward, but also when the trigger part 81 is not operated, and a continuous spray of liquid can be performed.

Further, in a state in which the reservoir plunger 50 is located at the rearmost position, if an operation of pulling the trigger part 81 rearward is performed, the liquid may be excessively supplied into the storage space 40*a*, and liquid leakage or damage to each part may occur. However, in the embodiment, the reservoir plunger 50 is moved rearward to some extent, the front lip portion 134 reaches the communication groove 127, and the storage space 40*a* is in communication with the inside of the container body A through the communication groove 127, the recovery hole 128 and the recovery passage 17. That is, the recovery passage 17 is in communication with the storage space 40*a* and the inside of the container body A when the reservoir plunger 50 is moved rearward. Accordingly, some of the liquid of the storage space 40*a* can be returned into the container body A, and excessive supply of the liquid into the storage space 40*a* can be suppressed. Accordingly, an excessive increase of the pressure in the storage space 40*a* can be suppressed, and occurrence of liquid leakage or damage to each part can be suppressed.

As described above, according to the trigger-type liquid sprayer 1 of the embodiment, the liquid can be sprayed not only when the trigger part 81 is pulled rearward, but also when the trigger part 81 is not operated, and a continuous spray of liquid can be performed. Further, since the upper end portion (supporting point) of the trigger part 81 is swingably axially supported by the nozzle member 3 and the main piston 83 is locked to an intermediate portion (working point) of the trigger part 81, for example, by operating the lower end portion (power point) of the trigger part 81, the main piston 83 can be efficiently moved using this theory. For this reason, operability of the trigger part 81 can be improved.

Further, according to the trigger-type liquid sprayer 1 of the embodiment, since the communication hole 122 is closed as the reservoir plunger 50 returns to an original position (the foremost position) due to the forward recovery movement, it is possible to suppress the liquid from reaching the spray hole 4. Accordingly, it is possible to prevent the liquid from leaking from the spray hole 4. Here, even when the internal pressure in the connecting tube portion 20 is increased as the communication hole 122 is closed, the internal pressure in the connecting tube portion 20 can be recovered and released to the container body A using the recovery mechanism 160.

Specifically, when the reservoir plunger 50 returns to the foremost position, as shown in FIG. 2, the front lip portion 134 reaches the recovery concave part 162 and is disposed in the recovery concave part 162. Accordingly, some of the liquid in the connecting tube portion 20 can be gradually released toward the annular space 165 through the space between the front lip portion 134 and the recovery concave part 162. Further, since the inside of the annular space 165 is in communication with the inside of the container body A through the recovery passage 17 provided in the vertical feed tube portion 10, some of the liquid released in the annular space 165 can be returned into the container body A.

In this way, some of the liquid in the connecting tube portion 20 can be recovered into the container body A through the recovery part 161 (the recovery concave part 162), the annular space 165 and the recovery passage 17, a residual pressure remaining in the connecting tube portion 20 can be reduced according to this. In particular, a part of the front lip portion 134 can be pushed up using the convex rib 163 shown in FIG. 4, the slight gap R can be formed around the convex rib 163. Accordingly, the gap R can be used preferentially, and the residual pressure can be gradually reduced more stably and smoothly.

Accordingly, it is possible to reduce stress acting on the sealing plug 100 that closes (seals) the opening portion 21 of the connecting tube portion 20, and prevent inconveniences such as the sealing plug 100 from shifting its position unintentionally. Accordingly, it is possible to prevent occurrence of liquid leakage or the like by maintaining proper sealability of the opening portion 21, and provide the trigger-type liquid sprayer 1 appropriate for continuous spray. Further, since the recovery part 161 can be simply formed by only forming the annular recovery concave part 162 in the inner circumferential surface of the reservoir cylinder 40, simplification of the configuration can be easily achieved.

Further, since the residual pressure in the connecting tube portion 20 can be reduced, the pressure with respect to the storage valve 91 can also be reduced. When the pressure in the connecting tube portion 20 is high, since the pressure acts on the storage valve 91 to close it, the storage valve 91 tends to be difficult to open. However, since the residual pressure in the connecting tube portion 20 can be reduced by the recovery mechanism 160, it is possible to eliminate the situation in which it is difficult to open the valve by reducing the pressure acting on the storage valve 91.

Further, in the trigger-type liquid sprayer 1 of the embodiment, when the main piston 83 is moved to the rearmost position from the foremost position to pressurize the inside of the bottom cylinder 82 by the operation of the trigger part 81, a conventional internal pressure recovery mechanism configured to bring the inside of the bottom cylinder 82 and the inside of the container body A in communication with each other is provided. In this regard, since the trigger-type liquid sprayer 1 of the embodiment is equipped with the recovery mechanism 160, it is possible to allow communication between the inside of the bottom cylinder 82 and the inside of the container body A through the recovery mechanism 160. For this reason, even when the internal pressure recovery mechanism is not provided, the internal pressure in the bottom cylinder 82 can be recovered using the recovery mechanism 160 and released into the container body A.

Accordingly, since the recovery mechanism 160 can also serve as the internal pressure recovery mechanism, there is no need to intentionally provide the internal pressure recovery mechanism. In this case, further simplification of the configuration can be achieved and the following effects can be exhibited. That is, a cylinder diameter of the bottom cylinder 82 can be made smaller, and a pulling pressure of the trigger part 81 can be reduced. Further, the recovery amount of the liquid into the container body A can be increased, and the amount of spray sprayed outside can be increased to that extent. Further, since the internal pressure in the bottom cylinder 82 can be recovered, for example, by increasing the internal pressure, it is possible to prevent inconveniences such as liquid coming into contact with the coil spring 84 through the space between the bottom cylinder 82 and the main piston 83 (liquid contact), or the like.

Hereinabove, while the embodiments of the present invention have been described, these embodiments are presented as examples and are not intended to limit the scope of the invention. The embodiments can be implemented in various other forms, and various omissions, substitutions, and changes can be made without departing from the spirit of the invention. The embodiments and their variants include, for example, those that can be easily assumed by a person skilled in the art, those that are substantially the same, and those that are equivalent.

For example, in the embodiment, although the recovery part 161 was configured using the recovery concave part 162 formed on the inner circumferential surface of the reservoir cylinder 40, the present invention is not limited to this case. The recovery part 161 may be configured in any way as long as at least the inside of the annular space 165 and the inside of the connecting tube portion 20 can be communicated through the feed hole 126, and the residual pressure inside the connecting tube portion 20 can be released into the annular space 165. Further, the convex rib 163 may not be required and may be omitted.

Figure 5:
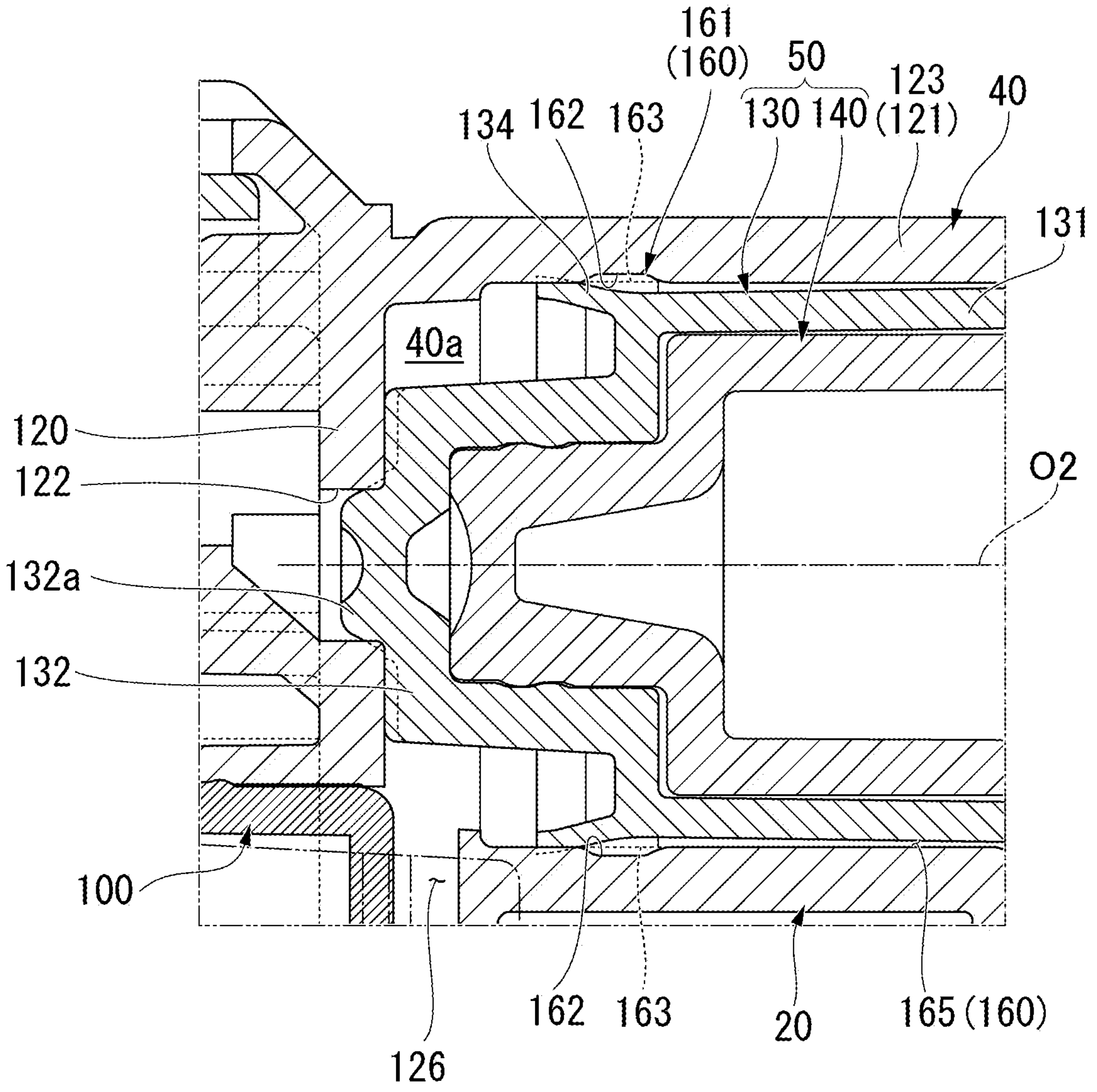
FIG. 5 is an enlarged cross-sectional view of a variant according to the present invention, showing a periphery of the front lip portion.

Further, in the embodiment, as shown in FIG. 2, when the reservoir plunger 50 reaches the foremost position, although the recovery concave part 162 is formed such that the front lip portion 134 is disposed in the recovery concave part 162, this is not limited to this case. The recovery concave part 162 may be formed such that the front lip portion 134 is positioned in the process in which the reservoir plunger 50 moves forward and reaches the foremost position. For example, as shown in FIG. 5, when the reservoir plunger 50 reaches the foremost position, the recovery concave part 162 may be formed to be located behind the front lip portion 134. Even in this case, the reservoir plunger 50 can be moved forward to dispose the front lip portion 134 in the recovery concave part 162 at the end of a continuous spray of liquid.

Accordingly, like the embodiment, the internal pressure of the connecting tube portion 20 can be recovered and released into the container body A. After that, the front lip portion 134 moves forward beyond the recovery concave part 162 as the reservoir plunger 50 moves further toward the foremost position. Accordingly, even in this case, regarding recovering the internal pressure of the connecting tube portion 20, it is possible to exhibit the same effect as the embodiment described above.

INDUSTRIAL APPLICABILITY

According to the trigger-type liquid sprayer of the present invention, an unintentional residual pressure in the connecting tube portion can be reduced, and proper sealability by the sealing plug can be maintained.

REFERENCE SIGNS LIST

A Container body
1 Trigger-type liquid sprayer
2 Sprayer body
3 Nozzle member
4 Spray hole
Vertical feed tube portion
17 Recovery passage
Connecting tube portion
21 Opening portion of connecting tube portion
Reservoir cylinder
50 Reservoir plunger
80 Trigger mechanism
81 Trigger part
100 Sealing plug
122 Communication hole
126 Feed hole
133 Rear lip portion (first lip portion)
134 Front lip portion (second lip portion)
160 Recovery mechanism
161 Recovery part
162 Recovery concave part
163 Convex rib
165 Annular space

The invention claimed is:

1. A trigger-type liquid sprayer comprising:

a sprayer body mounted on a container body in which a liquid is accommodated; and a nozzle member mounted on the sprayer body, and provided with a spray hole through which the liquid is sprayed, wherein the sprayer body includes:

a vertical feed tube portion configured to suck up the liquid in an inside of the container body;

a connecting tube portion extending from the vertical feed tube portion, and having an opening portion that opens outside the sprayer body;

a sealing plug mounted in the connecting tube portion to close the opening portion;

a trigger mechanism having a trigger part disposed to be movable rearward in a forward biased state, and configured to flow the liquid toward the spray hole from an inside of the vertical feed tube portion through an inside of the connecting tube portion according to the rearward movement of the trigger part;

a reservoir cylinder provided with a communication hole in communication with the spray hole and a feed hole in communication with the inside of the connecting tube portion, and into which the liquid passing through the inside of the vertical feed tube portion and the inside of the connecting tube portion is supplied through the feed hole according to the rearward movement of the trigger part;

a reservoir plunger disposed in the reservoir cylinder to be movable in an axial direction along a center axis of the reservoir cylinder, configured to move toward one side in the axial direction according to supply of the liquid into the reservoir cylinder, and biased toward the other side; and a recovery mechanism configured to recover an internal pressure of the connecting tube portion through the feed hole, the reservoir plunger is configured to block communication between an inside of the reservoir cylinder and the spray hole through the communication hole, and configured to allow communication between the inside of the reservoir cylinder and the spray hole through the communication hole when moved to the one side, and the recovery mechanism is configured to allow communication between the inside of the connecting tube portion and the inside of the container body through a space between an inner circumferential surface of the reservoir cylinder and an outer circumferential surface of the reservoir plunger, and configured to release the recovered internal pressure of the connecting tube portion toward the container body, the outer circumferential surface of the reservoir plunger includes:

an annular first lip portion provided therein, disposed on the one side in the axial direction, and in sliding contact with the inner circumferential surface of the reservoir cylinder; and an annular second lip portion provided therein, disposed on the other side in the axial direction, and in sliding contact with the inner circumferential surface of the reservoir cylinder, and the recovery mechanism includes:

an annular space defined between the inner circumferential surface of the reservoir cylinder and the outer circumferential surface of the reservoir plunger and between the first lip portion and the second lip portion;

a recovery passage provided in the vertical feed tube portion, and configured to allow communication between an inside of the annular space and the inside of the container body; and a recovery part provided between the inner circumferential surface of the reservoir cylinder and the second lip portion, and configured to allow communication between the inside of the annular space and the inside of the connecting tube portion through the feed hole, the recovery part includes a recovery concave part formed in the inner circumferential surface of the reservoir cylinder, and on which the second lip portion is disposed, and the recovery concave part is positioned with respect to the second lip portion such that an outer edge portion of the second lip portion comes into contact with the recovery concave part at a central position in a forward/rearward direction when the reservoir plunger reaches a foremost position.

2. The trigger-type liquid sprayer according to claim 1, wherein the recovery concave part includes:

a convex rib formed therein, protruding toward the reservoir plunger, and configured to push up a part of the second lip portion toward an inner side of the reservoir cylinder.

* * * * *